(12) United States Patent
Isgar

(10) Patent No.: US 10,277,730 B1
(45) Date of Patent: Apr. 30, 2019

(54) SMARTPHONE LOCK BOX SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

(21) Appl. No.: 16/005,554

(22) Filed: Jun. 11, 2018

Related U.S. Application Data

(60) Provisional application No. 62/587,931, filed on Nov. 17, 2017.

(51) Int. Cl.
| | | |
|---|---|---|
| *H04M 11/00* | (2006.01) | |
| *H04M 1/725* | (2006.01) | |
| *H04W 4/80* | (2018.01) | |
| *G08B 5/36* | (2006.01) | |

(52) U.S. Cl.
CPC ... *H04M 1/72563* (2013.01); *H04M 1/72527* (2013.01); *H04W 4/80* (2018.02); *G08B 5/36* (2013.01)

(58) Field of Classification Search
CPC . H04M 1/72563; G07C 11/00; G07C 9/00007
USPC ...................... 455/405; 340/5.73; 312/223.4
See application file for complete search history.

(56) References Cited

U.S. PATENT DOCUMENTS

| | | | | |
|---|---|---|---|---|
| 1,473,001 A | * | 11/1923 | White .................... | H01H 9/282 200/43.14 |
| 2,280,542 A | * | 4/1942 | Rosendale ............... | E04H 1/14 312/139.1 |
| 2,716,882 A | * | 9/1955 | Vold ......................... | G07F 9/10 70/159 |
| 2,743,035 A | * | 4/1956 | Fogarty ................. | H01M 2/043 109/82 |
| 3,185,535 A | * | 5/1965 | Williams ................. | E04H 1/14 312/223.4 |
| 3,190,708 A | * | 6/1965 | Trimnal ................... | B65D 9/18 312/213 |
| 3,926,487 A | * | 12/1975 | Reyes .................... | A47B 81/06 312/213 |
| 4,204,097 A | * | 5/1980 | Schmit .................. | H04M 1/667 379/445 |
| 4,297,539 A | * | 10/1981 | Fairbanks ............ | H04M 1/667 379/445 |

(Continued)

OTHER PUBLICATIONS

Misener, D(Oct. 4, 2016) retrieved from https://www.cbc.ca/news/technology/distractagone-smartphone-lockbox-1.3790485 1/.*

*Primary Examiner* — Charles T Shedrick
(74) *Attorney, Agent, or Firm* — Schmeiser, Olsen & Watts, LLP

(57) ABSTRACT

Described is a smartphone lock box system that is used to track and record when and how long a mobile computing device is locked or secured in a container, such as a box (lock box), a sleeve or the like, without access by the owner of the mobile computing device. The smartphone lock box system is used to help the owner of a mobile computing device disconnect from the mobile computing device to devote time and attention to other tasks. The smartphone lock box system includes a container that holds at least one mobile computing devices such as a smartphone or tablet. The container senses when a mobile computing device is within it and records and reports the amount of time the mobile computing device is in the box and tracks the frequency that the user checks or removes the phone from the box.

21 Claims, 17 Drawing Sheets

(56) References Cited

U.S. PATENT DOCUMENTS

| | | | | |
|---|---|---|---|---|
| 4,411,482 | A * | 10/1983 | Hoff | H04M 1/21 |
| | | | | 312/231 |
| 4,750,204 | A * | 6/1988 | Bartley | H04M 1/667 |
| | | | | 379/445 |
| 4,993,244 | A * | 2/1991 | Osman | B60R 11/0241 |
| | | | | 455/575.8 |
| 6,047,573 | A * | 4/2000 | Martinez | E05B 67/383 |
| | | | | 220/367.1 |
| 6,185,964 | B1 * | 2/2001 | Addiego | G06F 3/039 |
| | | | | 248/551 |
| 6,520,405 | B1 * | 2/2003 | Braxter | A47G 29/1209 |
| | | | | 232/45 |
| 6,951,468 | B1 * | 10/2005 | Greco | G06F 1/1632 |
| | | | | 312/236 |
| 6,989,732 | B2 * | 1/2006 | Fisher | G07C 9/00103 |
| | | | | 109/45 |
| 7,009,489 | B2 * | 3/2006 | Fisher | G07C 9/00103 |
| | | | | 235/382 |
| D539,633 | S * | 4/2007 | Van Handel | D8/333 |
| 7,360,380 | B2 * | 4/2008 | Van Handel | A45C 13/1084 |
| | | | | 211/9 |
| 7,712,437 | B2 * | 5/2010 | Leung | A01K 1/0245 |
| | | | | 119/28.5 |
| 7,734,068 | B2 * | 6/2010 | Fisher | E05B 19/0005 |
| | | | | 382/115 |
| 7,921,683 | B2 * | 4/2011 | Largay, Jr. | E05B 63/0052 |
| | | | | 220/370 |
| 8,451,088 | B2 * | 5/2013 | Fisher | A47G 29/10 |
| | | | | 340/5.73 |
| 9,016,095 | B2 * | 4/2015 | Dudgeon | E05G 1/08 |
| | | | | 109/53 |
| 9,053,629 | B2 * | 6/2015 | Fisher | G08C 17/02 |
| 9,300,347 | B1 * | 3/2016 | Coverstone | H04B 1/3888 |
| 9,430,892 | B2 * | 8/2016 | Amdahl | G07C 9/00896 |
| 9,562,374 | B1 * | 2/2017 | Haber | E05B 83/14 |
| 9,780,579 | B2 * | 10/2017 | Frankenberger | H02J 7/0027 |
| 9,990,791 | B2 * | 6/2018 | Firth | G07C 9/00571 |
| 10,027,795 | B1 * | 7/2018 | Maguire | H04M 1/72569 |
| 2006/0272969 | A1 * | 12/2006 | Hartstein | A45C 13/02 |
| | | | | 206/320 |
| 2009/0026899 | A1 * | 1/2009 | Jerro | A47B 81/00 |
| | | | | 312/223.4 |
| 2011/0014863 | A1 * | 1/2011 | Foster | H04K 3/415 |
| | | | | 455/1 |
| 2013/0143489 | A1 * | 6/2013 | Morris | H04B 5/0056 |
| | | | | 455/41.1 |
| 2013/0281169 | A1 * | 10/2013 | Coverstone | H04M 1/0283 |
| | | | | 455/575.8 |
| 2014/0128131 | A1 * | 5/2014 | Sin | H04M 1/185 |
| | | | | 455/575.8 |
| 2014/0268517 | A1 * | 9/2014 | Moon | H05K 7/00 |
| | | | | 361/679.01 |
| 2015/0155917 | A1 * | 6/2015 | Won | H04M 1/7253 |
| | | | | 455/41.1 |
| 2015/0229754 | A1 * | 8/2015 | Won | G06F 1/165 |
| | | | | 455/575.8 |
| 2016/0050303 | A1 * | 2/2016 | Larriviere | H04B 1/3888 |
| | | | | 455/575.8 |
| 2016/0182115 | A1 * | 6/2016 | Chen | H04B 1/3888 |
| | | | | 455/575.8 |
| 2016/0270025 | A1 * | 9/2016 | Osann, Jr. | H04W 64/006 |
| 2016/0321847 | A1 * | 11/2016 | Briskey | G07C 9/00087 |
| 2017/0323503 | A1 * | 11/2017 | Garcia | G07C 9/00309 |

\* cited by examiner

SMARTPHONE LOCK BOX SYSTEM

CROSS REFERENCE TO RELATED APPLICATION[S]

This application claims priority to U.S. Provisional patent application entitled "SMARTPHONE LOCK BOX SYSTEM," Ser. No. 62/587,931, filed Nov. 17, 2017, the disclosure of which is hereby incorporated entirely herein by reference.

BACKGROUND OF THE INVENTION

Technical Field

This invention relates to smartphone accessories, and specifically to a box for locking a smartphone into that tracks the amount of time the smartphone is locked or secured in the box preventing access to the smartphone to eliminate distractions while working, studying or other activities and tracks the frequency that the user checks or removes the phone from the lock box.

State of the Art

Individuals spend increasing amounts of time using their smartphones. This includes significant usage in the workplace, during study hours and the like. In fact, there is a growing concern about addictiveness of smartphones, particularly with teenagers and college students. This increased use of smartphones is bleeding over into increased use in the workplace, causing inefficiencies and posing concern for companies. With regard to students, parents often have trouble getting their student aged children to put the smartphone down for homework, housework, or other activities. Parents often use a student's smartphone as an incentive to get the student to perform a task.

Accordingly, what is needed is a container for placing a smartphone in that tracks and reports the amount of time that the smartphone is secured in the box and the time of day, frequency it is removed and reports the phone owner's accessing the device. The box does not have to physically lock but merely provide a physical barrier from being a distraction from the owner.

DISCLOSURE OF THE INVENTION

The disclosed invention relates to smartphone accessories, and specifically to a box for securing a smartphone into that tracks and reports the amount of time the smartphone is secured in the box and the frequency that the user checks or removes the phone from the lock box.

An embodiment includes a smartphone lock box system comprising: a container, wherein the container holds a mobile computing device and limits physical access to the mobile computing device; a microcomputer integrated into the box, wherein the microcomputer is communicatively coupled to the mobile computing device and receives communication from a lock box application running on the mobile computing device; a sensor that senses when the mobile computing device is in the box; and a display coupled to the microprocessor and to one of the lid or the box.

Another embodiment includes a smartphone lock box system comprising: a retaining unit, wherein the retaining unit holds a plurality of mobile computing devices; a microcomputer integrated into the retaining unit, wherein the microcomputer is communicatively coupled to the plurality of mobile computing devices and receives information from a plurality of lock box applications, each lock box application running on one of the plurality of mobile computing devices; and a sensor that senses when one or more of the plurality of mobile computing devices is in the retaining unit.

Another embodiment includes a method of using a smartphone lock box system, the method comprising: coupling a plurality smartphone lock boxes to a server, wherein each smartphone lock box is associated with an individual employee; placing a plurality of smartphones of employees within a plurality of smartphone lock boxes, wherein one smartphone is placed within one smartphone lock box; sensing whether the plurality of smartphones are within the plurality of smartphone lock boxes in response to a sensor in each smartphone lock box sensing the presence of a smartphone, wherein each smartphone lock box communicates to the server the time the smartphone is placed within the smartphone lock box and communicates to the server the time the smartphone is removed from within the smartphone lock box; automatically storing all times communicated from the smartphone lock boxes in a memory of the server; and automatically generating a report of times that each smartphone lock box associated with each individual employee contained a smartphone to determine the time and frequency that each individual employee's smartphone is within the smartphone lock box. Each employer and work group can establish acceptable limits of access and set the system to only alert or report when over use is recognized. Also, the system can provide a report of cumulative distraction free or smartphone free time worked, start time and end time and frequency of distractions for a certain worker at their station.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1A:
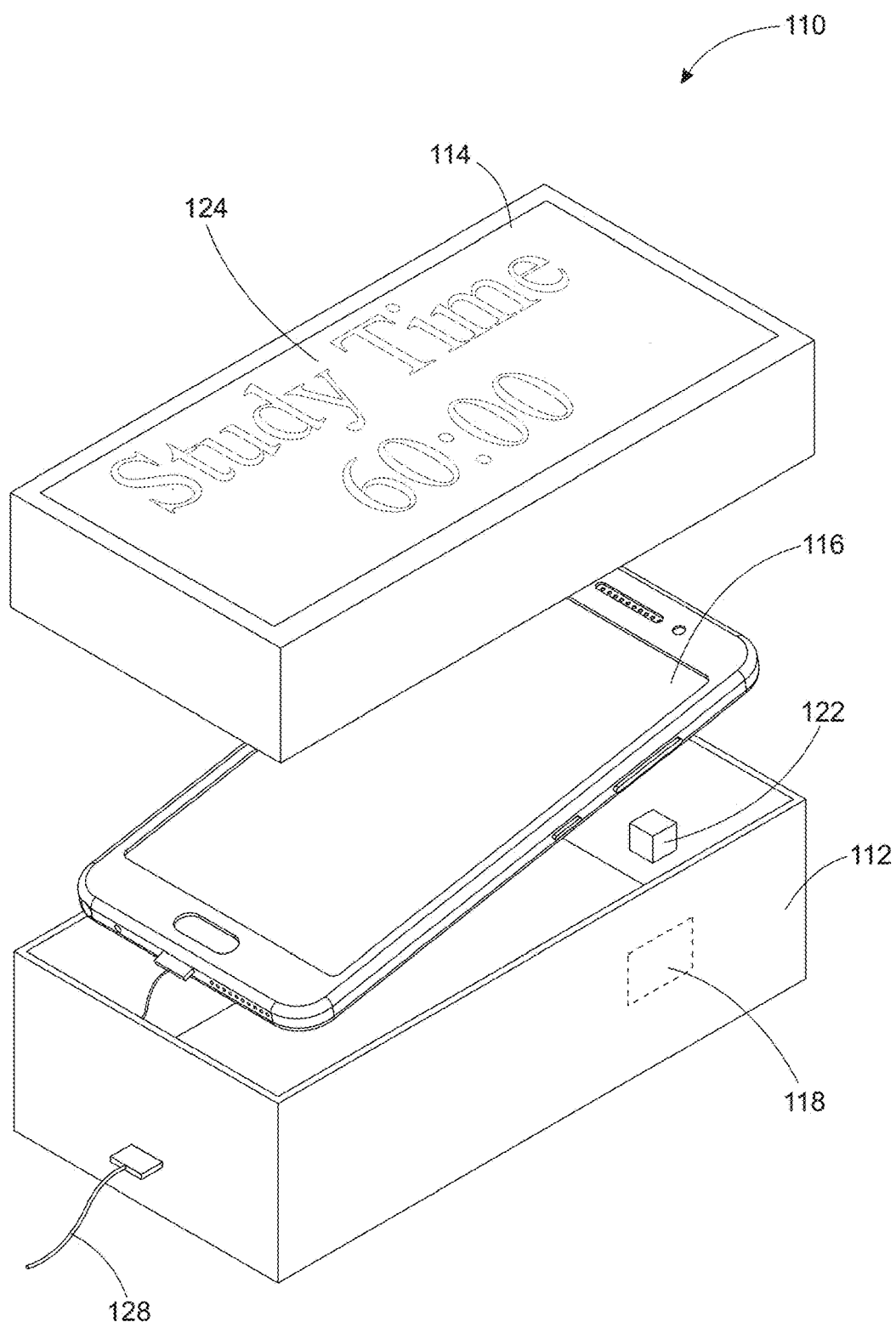
FIG. 1A is a perspective view of a smartphone lock box system according to an embodiment.

As discussed above, embodiments of the present invention relate to smartphone accessories, and specifically to a box for locking a smartphone into that tracks the amount of time the smartphone is locked or secured in the box.

It is increasingly recognized that smart phones have become a significant distraction to teens, students and workers. Many millennials check their phones over 100 times a day and spend hours engaged with the device each day. Numerous studies cite that smartphone device addiction is a significant parenting and learning issue. Also, the workplace has recognized that constant checking of the smart phones leads to disengagement and distraction from work effecting productivity for certain companies. Recently a leading phone maker has recognized that the devices are being overutilized and encouraging solutions to monitor and limit usage.

Disclosed is a smartphone lock box system that can be used to track and record time that a smartphone is locked or secured in a box with limited physical access. The smartphone lock box system includes a box for locking a mobile computing device such as a smartphone or tablet into, so that the mobile computing device cannot be physical utilized while in the box. The smartphone lock box system can be used by employers and employees to have the employees check in their smartphones to limit distractions while working. The smartphone lock box system when used in a workplace environment records and reports the amount of time the mobile computing device is locked or secured in a retaining unit and the frequency and duration of any times the employees remove the phone from the retaining unit. Each employer and work group can establish acceptable limits of access and set the system to only alert or report when over use is recognized. Also, the system can provide a report of cumulative smartphone free time worked, start time and end time and frequency of distractions for a certain worker at their station.

The smartphone lock box system can be used by parents and children to get the children to leave their smartphones alone while doing homework or housework, or to just spend time without using the smartphone. The smartphone lock box system records and reports the amount of time and time off day the mobile computing device is locked or secured in the box. Parents can use the smartphone lock box system to incentivize a child not using their mobile computing device for certain amounts of time or at certain times of the day. The smartphone lock box system helps young adults get away from their smartphones, and helps parents monitor and track the mobile computing device usage of their children. Parents use the smartphone lock box system to encourage and reward their children for paying attention to schoolwork and become less reliant on technology.

FIGS. 1-11C depicts embodiments of a smartphone lock box system 110.

Smartphone lock box system 110 is used to lock a smartphone or other mobile computing device into a box so that the smartphone cannot be accessed for a certain period of time. The smartphone lock box system can be used by parents who want to encourage and reward their children for paying attention to schoolwork, housework, family, or to just become less reliant on their smartphones.

Smartphone lock box system 110 includes a box 112 with a lid 114. Box 112 is designed to contain a mobile computing device 116. Lid 114 locks onto box 112 so that mobile computing device 116 cannot be accessed while it is locked or secured in box 112. Box 112 has a microcomputer 118 integrated into box 112. Microcomputer 118 is communicatively coupled to a lock box software application 126 running on mobile computing device 116. Microcomputer 118 is communicatively coupled to lock box application 126 using a communication link 120. Lock box application 126 runs on mobile computing device 116 to communicate with box 112 and control smartphone lock box system 110. Box 112 has a sensor 122 that senses when mobile computing device 116 is inside box 112 and allows the communication link 120 to be activated. A display 124 is integrated into lid 114 such that display 124 is visible from the outside of box 112.

Mobile computing device 116 can be any type of mobile device with computing capability, such as a smartphone, a cellular telephone, a mobile computer, a computing tablet or pad, or any other device that can be mobile and has computing capabilities. Mobile device 116 is a smartphone in the embodiment shown in the figures, but this is not meant to be limiting. Additionally, the box 112 may be any type of retaining unit, such as a basket, a container, a multi-slot shelving system, a locker or set of lockers and the like.

Mobile computing device 116 has a lock box application 126 loaded onto mobile computing device 116 in this embodiment. Lock box application 126 is communicatively coupled to microcomputer 118 of box 112 using communication link 120. Communication link 120 is a wireless communication link is this embodiment, but can be a wired communication link. Lock box application 126 controls smartphone lock box system 110 and records and reports when mobile computing device 116 is locked or secured in box 112, and for how long. Lock box application 126 is a software application in this embodiment, but this is not meant to be limiting.

According to particular embodiments, communication link 120 may be a Near Field Communication ("NFC") link. NFC is related to radio-frequency identification (RFID) with the exception that NFC is designed for use by devices within close proximity to each other. Devices using NFC may be active or passive. A passive device has information that is readable by other devices; however, the passive device cannot read information of another device. Active devices can read and send information. An example of an active device is a smartphone. In active NFC, each device is active and when a device sends data it generates an RF field and when waiting the device does not generate an RF field. In other words, the RF field is alternately generated by each device. In passive NFC, the RF field is only generated by one device. NFC devices may also provide secure communication by using a secure channel and encryption when sending sensitive information.

In general, there are three current signaling technologies for NFC devices to talk to each other. These signaling technologies are referred to as NFC-A, NFC-B and NFC-F. When devices first communicate, they communicate the signal type and then transmit data in compliance with the specified protocol.

NFC-A corresponds with RFID Type A communication. In Type A communication, Miller encoding is used with amplitude modulation at 100 percent. A signal sent between devices must change from 0 to 100 percent to register the difference between sending a "1" and a "0." Data is transmitted at 106 Kbps when using Type A communication.

Similar to NFC-A, NFC-B corresponds with RFID Type B communication. Type B uses Manchester encoding. Amplitude modulation is at 10 percent, wherein a 10 percent change from 90% for low to 100% for high is used. A change from low to high represents a "0" while high to low represents a "1."

NFC-F refers to a faster form of RFID transmission known as FeliCa. FeliCa is a technology similar to NFC but faster and currently more popular. It is used for a variety of services such as subway tickets, credit card payments, and identification at office buildings and other locations with limited access.

The system 10 may utilize various types of NFC communication, including active or passive NFC, as well as using various types of signals. The NFC would provides close proximity communication between the mobile computing device 116 and the lock box 112 only when the mobile computing device 116 is placed within the lock box 112.

Box 112 is designed to hold mobile computing device 116. Box 112 has a locking lid 114 that will lock mobile computing device 116 in box 112. Box 112 can be made in different sizes for different mobile computing device sizes. In some embodiments, box 112 can be made large enough to hold multiple mobile computing devices 116. Smartphone lock box system 110 may be used by churches or schools to contain a number of mobile computing devices 116. In some embodiments, box 112 will be able to contain and communicate with a plurality of mobile computing devices 116.

Microcomputer 118 is integrated into box 112 to provide box 112 with computing and communication ability. Microcomputer 118 includes a microprocessor 140 and memory 142 in this embodiment, but this is not meant to be limiting. Microcomputer 118 can include many types of computing hardware and software to give box 112 computing and communications capability. Microcomputer 118 is communicatively coupled to app 126 of mobile computing device 116 using communication link 120.

Box 112 includes a sensor 122 that senses when mobile computing device 116 is in box 112. Sensor 122 can be an NFC sensor, a Bluetooth™ sensor or any other type of sensor that can determine when mobile computing device 116 is in box 112. Sensor 122 is communicatively coupled to microcomputer 118 using a communication link 136, which can be wired or wireless.

In some embodiments, box 112 receives power from a power cable 128. In some embodiments, box 112 receives power from at least one battery. Mobile computing device 116 can be charged while in box 112 using a power connection 138 between box 112 and mobile computing device 116.

Figure 1B:
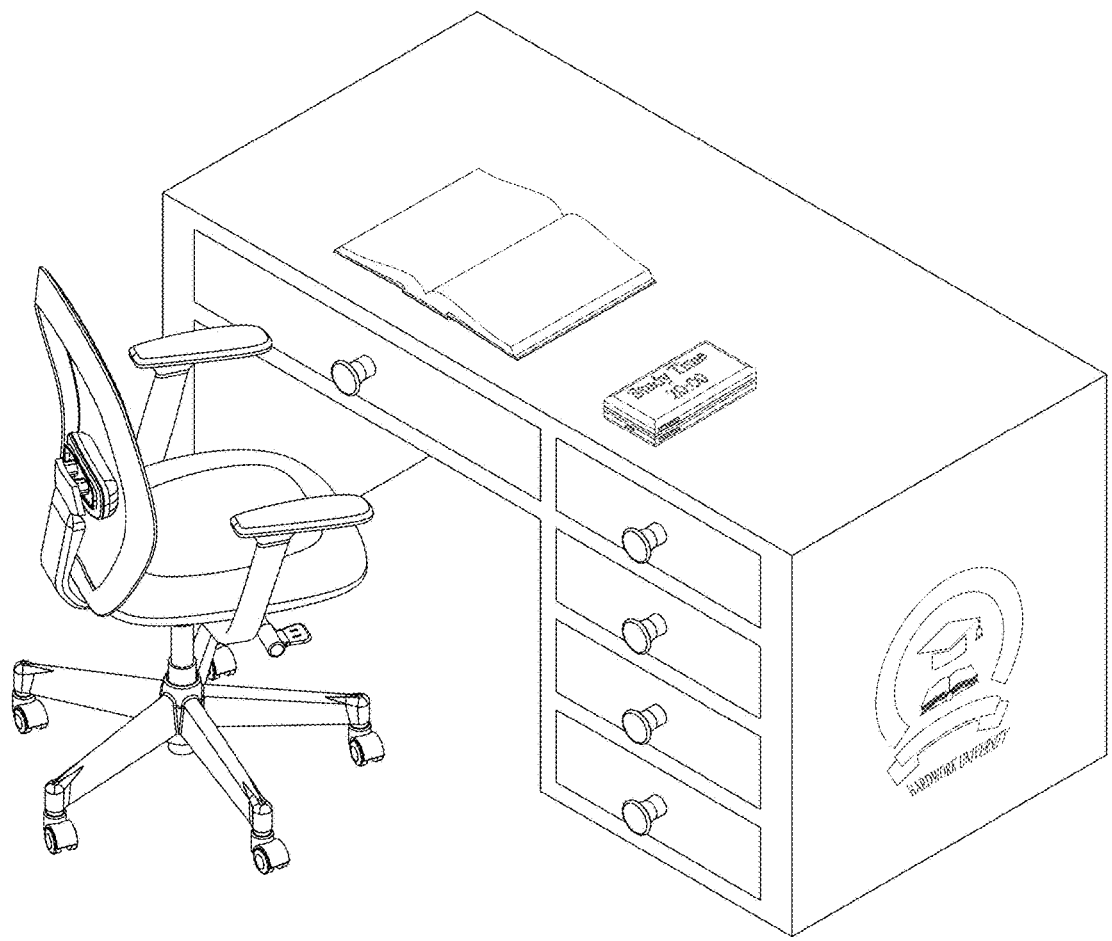
FIG. 1B is a perspective view of a smartphone lock box on a student desk according to an embodiment.
Figure 1C:
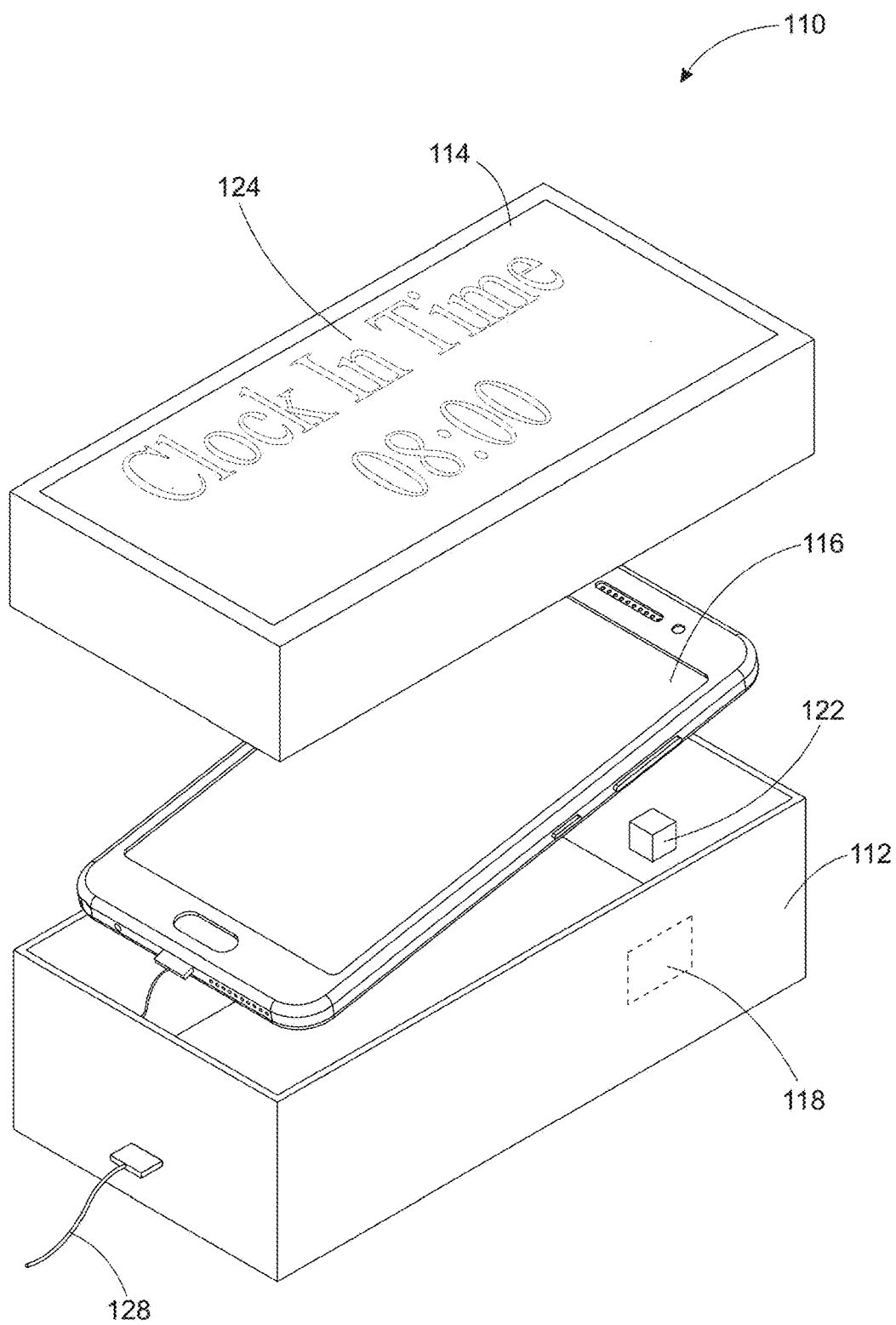
FIG. 1C is a perspective view of a smartphone lock box system for use in an employment environment according to an embodiment.
Figure 1D:
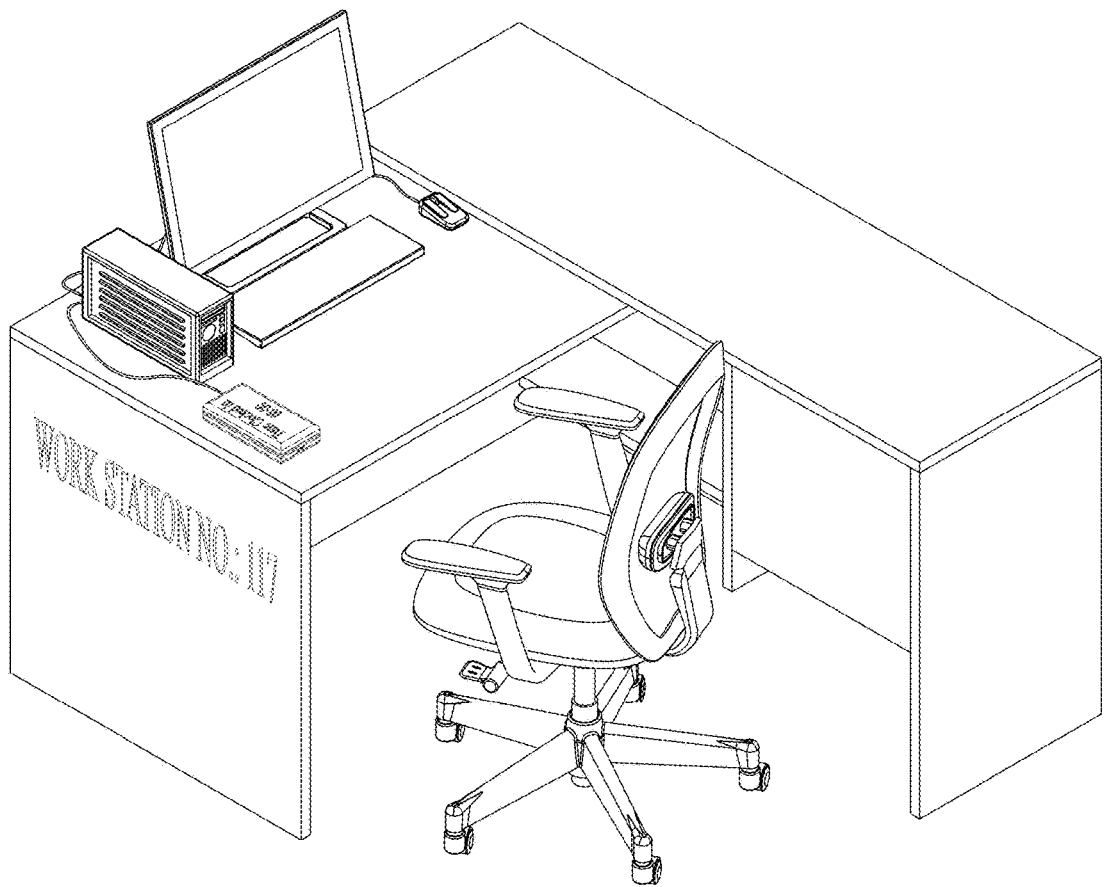
FIG. 1D is a perspective view of a smartphone lock box system on a workplace desk according to an embodiment.
Figure 2:
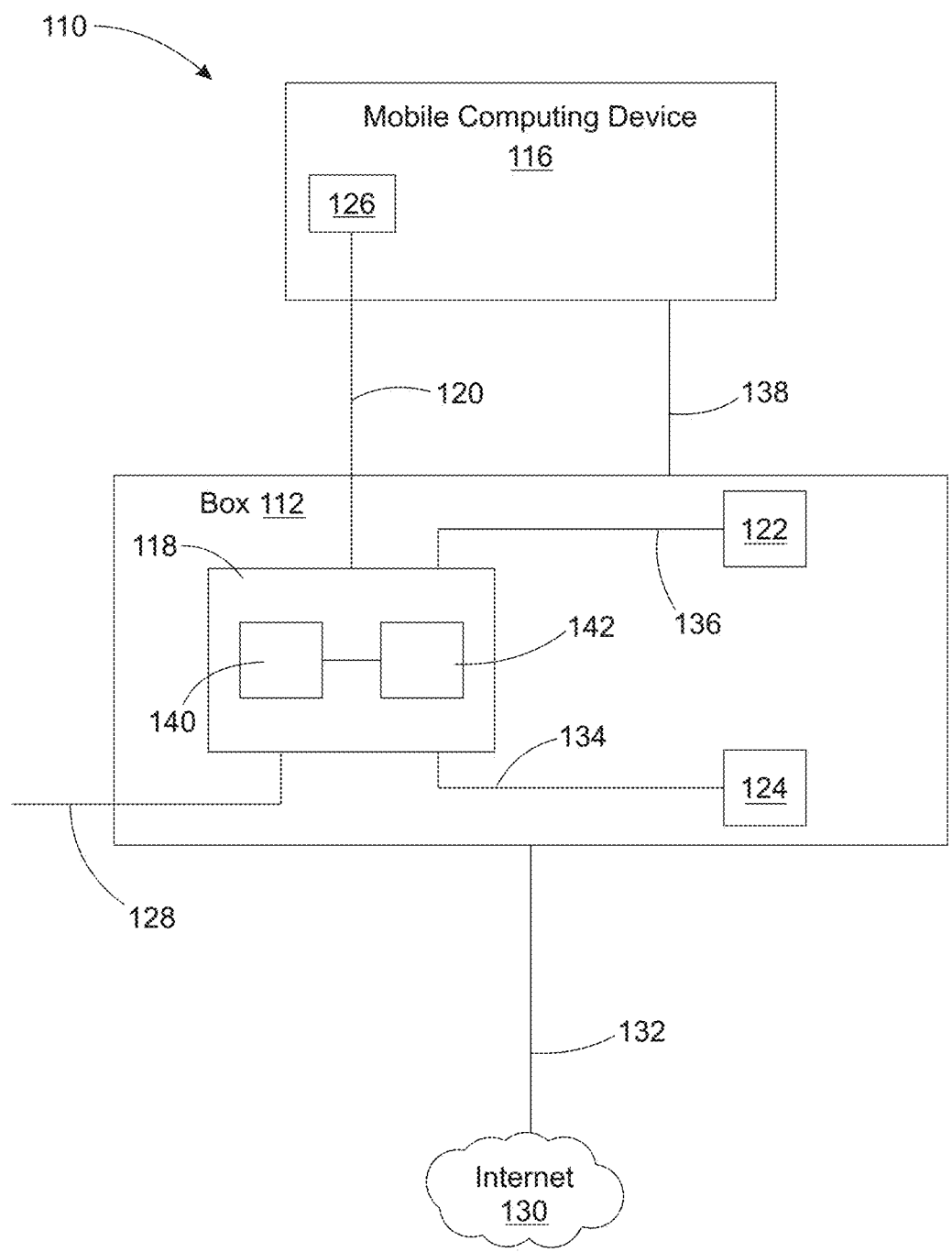
FIG. 2 shows a block diagram of the smartphone lock box system of FIG. 1 according to an embodiment.

In embodiments depicts in FIGS. 1C-1D, the smartphone lock box system 110 may include lock boxes 112 being used in by a business, workplace, team manager, supervisor or employer-employee environment. The use of smartphones in the workplace is a drain of the productivity of the workforce. The insertion of a smartphone within a lock box 112 may operate as a "clock in" and "clock out" function for the employee. As depicted in FIGS. 1C-1D, the lock box 112 may be located at a workstation and may be connected to a computer at the workstation. The employee or the like may place his or her smartphone or other mobile computing device 116 within the lock box 112. The lock box 112 may then be able to communicate with the system 110 through the network connection of the computer of the workstation. Further, lock box data, including the information of the employee using the lock box 112 and the time that the smartphone 116 is within each lock box 112 may be reported to a server through the network connection of the workstation computer. In other embodiments, lock box data, including the information of the employee using the lock box 112 and the time that the smartphone 116 is within each lock box 112 may be reported to a server through a wireless network. Further still, the smartphone or mobile computing device 116 may communicate the lock box data through its network by operation of a lock box application. The server may automatically produce and deliver to a supervisor or the like a report that depicts the usage of the smartphone lock boxes by the employees. This lock box data can be utilized to determine effectiveness of employees and the effects of smartphone accessibility on productivity of the employees.

When operating within the work environment, the lock box 112 may not be utilized as a clocking in feature but may operate to track smartphone usage by the employee when the employee should be working. In these embodiments, the system 110 may determine whether the employee had his or her smartphone 116 within the lock box 112 at times when the employee is clocked in and in a status of at work. Further, the system 110 may be configured to account for breaks by the employee, such as 15-minute breaks, lunch breaks and the like during the day, wherein the employee removes his or her smartphone 116 from the lock box 112 during the break. This will lead to employees that still have the ability to utilize the phone during breaks and reduce distraction from the smartphone during times when the employee is working. Employers may also have the ability to vary the settings to allow employees to access their phones a certain number of times in a workday, for a certain amount of time in a workday, or a combination of certain number of times and amount of time in a workday. In other words, as previously stated, each employer and work group can establish acceptable limits of access and set the system to only alert or report when over use is recognized. Also, the system 110 can provide a report of cumulative distraction free time worked, start time and end time and frequency of distractions for a certain worker at their station.

The system 110 in a workplace environment, may include a display (as described below with regard to FIGS. 1A-1B) or other audio and/or visual means of alerting an employee of certain types of messages or calls that come through the smartphone 116 that may be an emergency or otherwise urgent. This still allows the employee to avoid distractions without the concern of missing an urgent call from sources, like a child, a child's school, emergency alerts, government alerts, Amber alerts, weather alerts, and the like.

Figure 12:
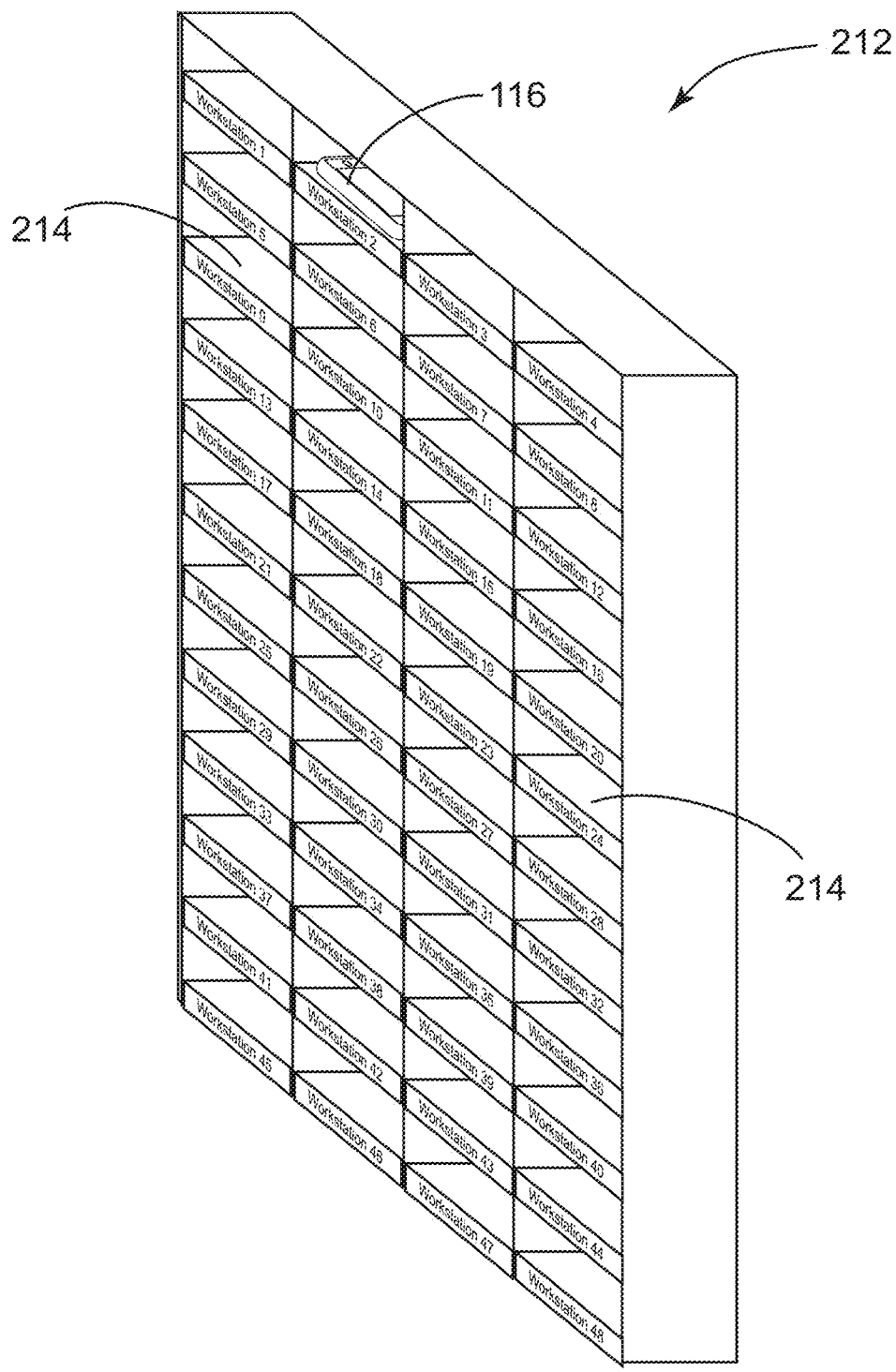
FIG. 12 is a perspective view of retaining unit for retaining a plurality of mobile computing devices, such as smartphones, for use in a workplace environment according to an embodiment.

Further, as shown in FIG. 12, the box 112 may be a multi-slot retaining unit 212, wherein there are multiple slots 214 within the retaining unit 212 sized and shaped to receive a plurality of mobile computing devices 116, such as smartphones. In such embodiments, each slot may operate in a manner similar to the lock box 112 for determining whether the smartphone 116 is within a slot 214 of the retaining unit 212 and reports the amount of time and frequency of the smartphones 116 that are removed and is capable of identifying which smartphone 116 has been removed. This embodiment of retaining unit 212 may be utilized in work environments that have a plurality of employees that would require a large number of lock boxes 112 in order to be effective. It may also be applicable in location such as, but not limited to a workplace environment that is a secured environment requiring security clearance or where outside communication is restricted such as, a laboratory, a research development facility and the like. Further, it can be used in locations such as, but not limited to, a school, a church or the like.

The retaining unit 212 may further include a single microcomputer that can operate with the system 110 to establish a geofence, wherein a smartphone 116 operating the lock box application 126 enters the geofence when being inserted within a slot 214 of the retaining unit 212 and communicates user information in order to identify the owner of the smartphone 116 within the retaining unit 212. The operation may then be similar to or identical to the lock box 112 once the smartphone 116 is within the retaining unit 212. This may include a charging cable or other charging device that operate to charge the smartphone 116 while it is within the slot 214 of the retaining unit 212.

In embodiments shown in FIGS. 1A and 1B, lid 114 of box 112 has a display 124 mounted to the outside of lid 114 so that display 124 can be viewed when box 112 is closed. Display 124 displays information related to mobile computing device 116 and smartphone lock box system 110. When mobile computing device 116 is locked or secured in box 112, display 124 can show the amount of time that mobile computing device 116 has been in box 112. Or, display 124 can display the amount of time that mobile computing device 116 still needs to be in box 112, for example. Parents can set up reward systems for their children to encourage them to leave their mobile computing device 116 in box 112 for a certain amount of time, for example, or during certain times of the day. Display 124 can provide feedback on when mobile computing device should be in box 112 and when and how long mobile computing device 116 has been in box 112. Display 124 is communicatively coupled to microcomputer 118 using a communication link 134. Display 124 can display information from mobile computing device 116. For example, mobile computing device 116 and lock box app 126 can be programmed to send messages from certain individuals to display 124, or other important or emergency information. There may be messages or contacts that have priority status, and this information can be set to be sent to display 124 while mobile computing device 116 is in box 112, so that the user can see these priority messages. In some embodiments, display 124 is mounted to a location on box 112 different than on lid 114.

Figure 8:
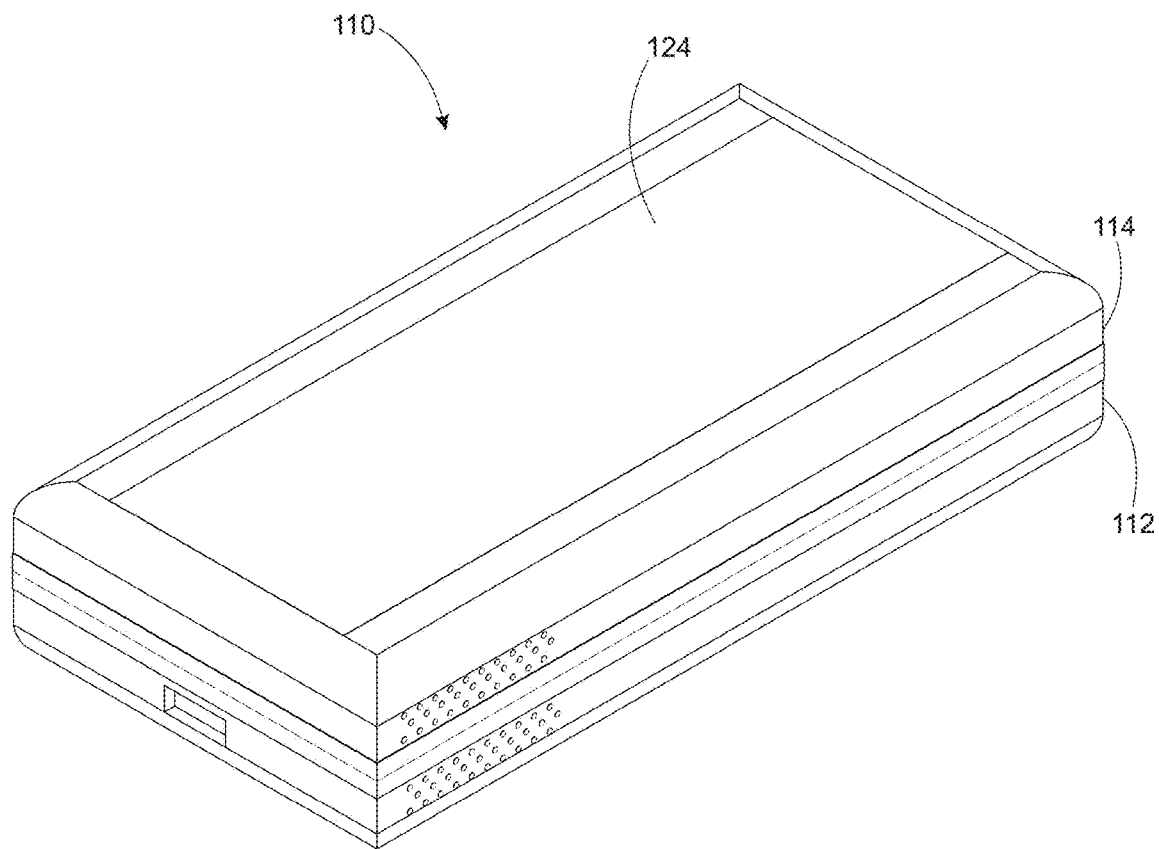
FIG. 8 is a perspective view of a smartphone lock box system with a large display screen according to an embodiment.
Figure 9:
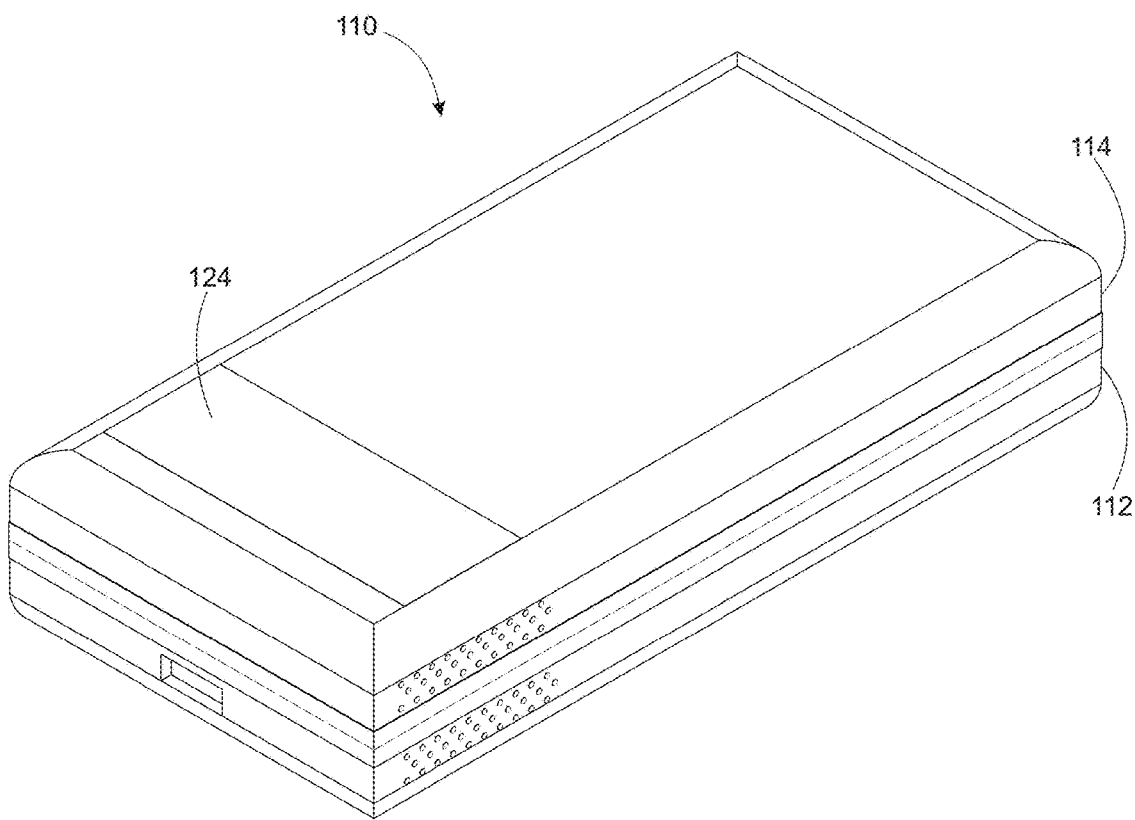
FIG. 9 is a perspective view of a smartphone lock box system with a small display screen according to an embodiment.
Figure 10:
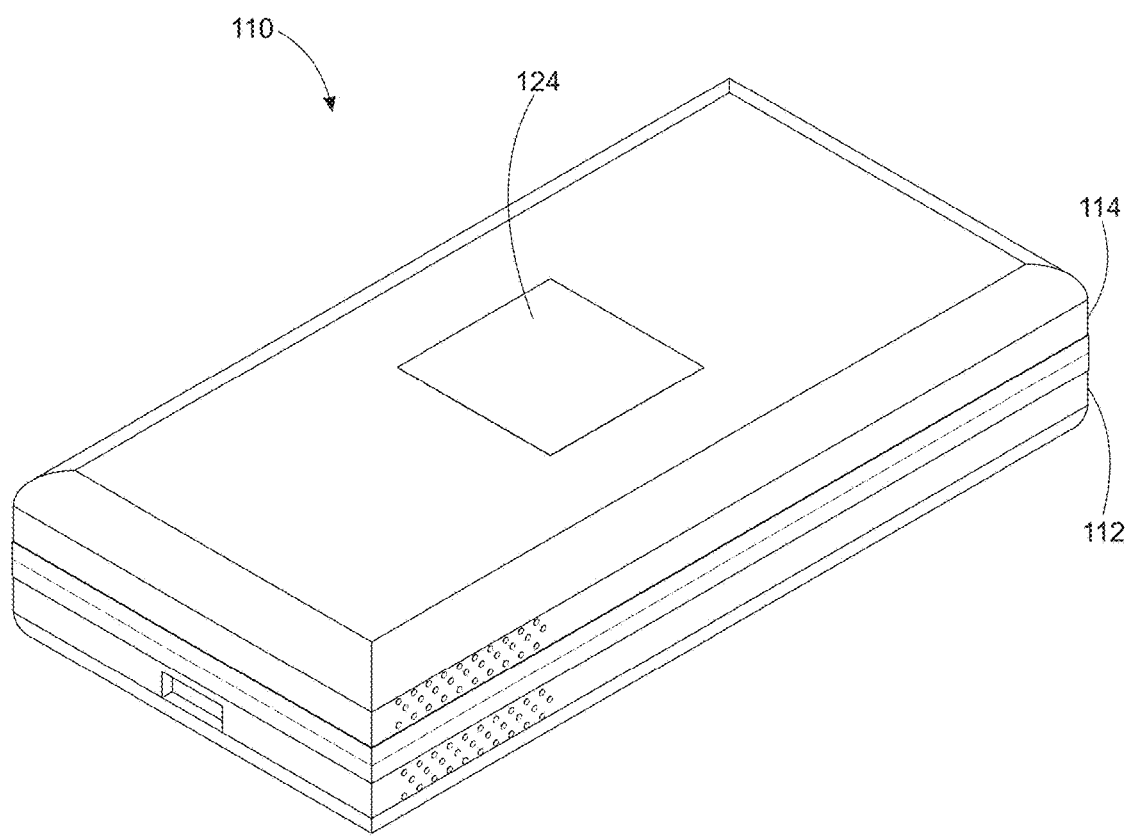
FIG. 10 is a perspective view of a smartphone lock box system with a small display screen according to an alternative embodiment.

In some embodiments, display 124 may be a screen that is substantially similar in length and width to a length and width of the lid, as shown in FIG. 8. In some embodiments, display 124 may be a screen that is substantially smaller in width and/or length than a length and width of the lid, as shown in FIG. 9 and FIG. 10.

Figure 3:
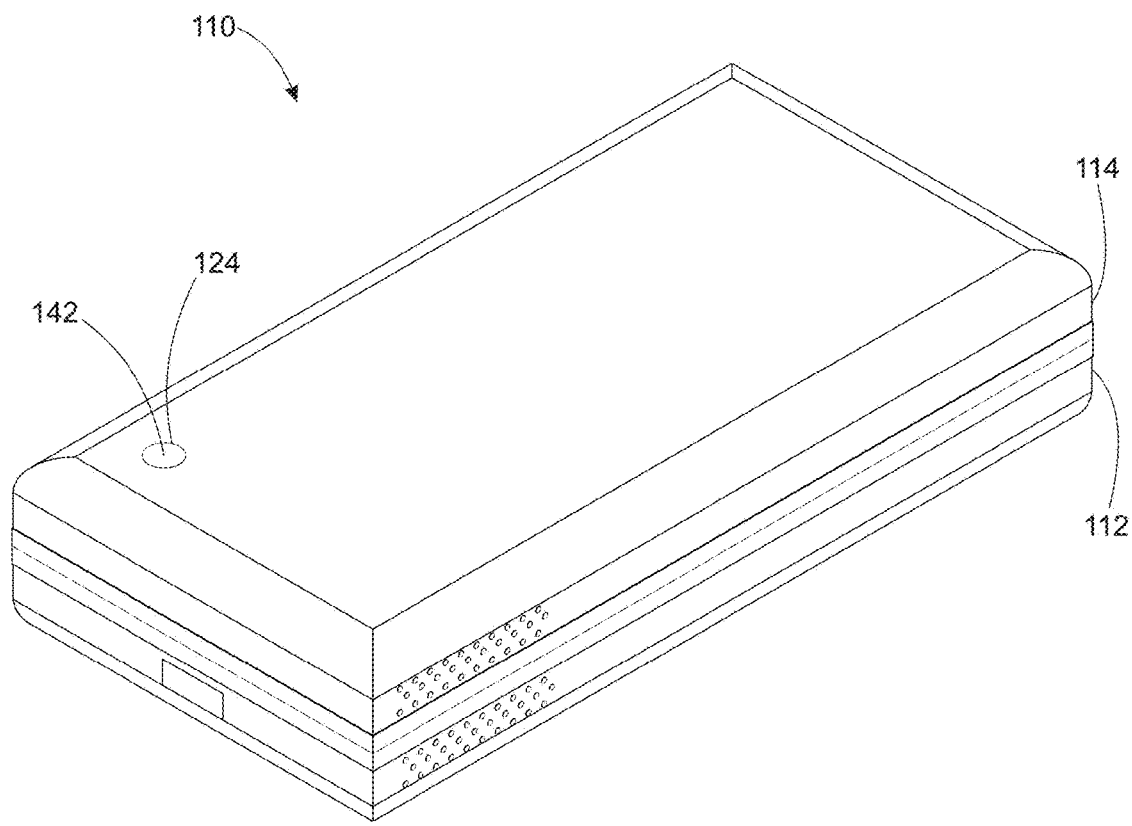
FIG. 3 is a perspective view of a smartphone lock box system according to an embodiment.
Figure 4:
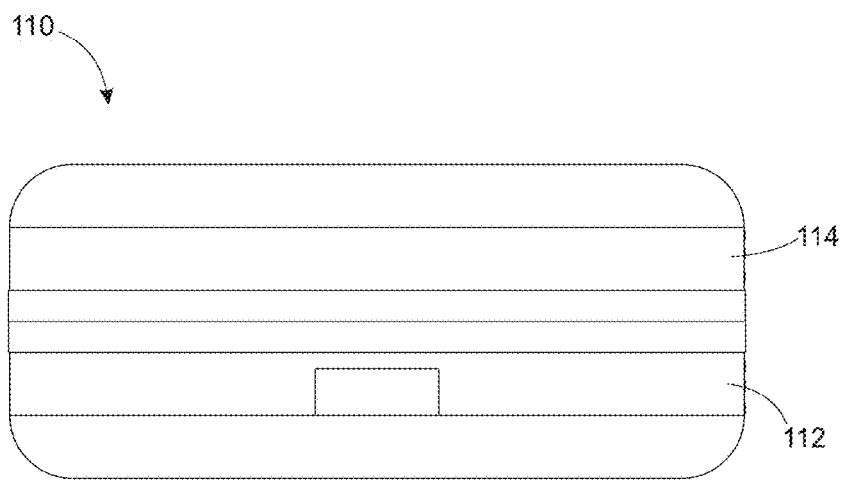
FIG. 4 is a front view of a smartphone lock box system according to an embodiment.
Figure 5:
FIG. 5 is a side view of a smartphone lock box system according to an embodiment.
Figure 6:
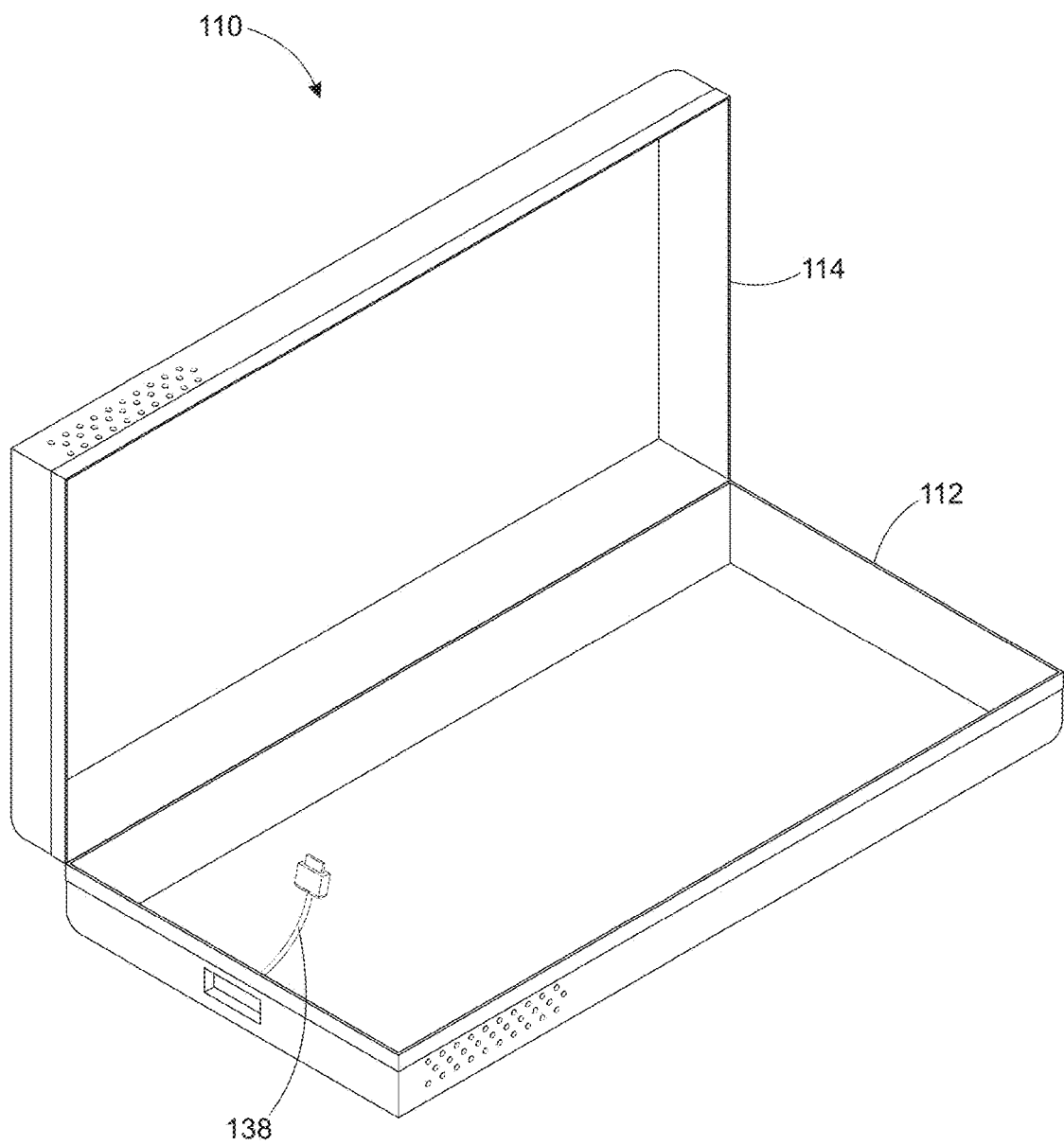
FIG. 6 is a perspective view of a smartphone lock box system with the lid opened according to an embodiment.
Figure 7:
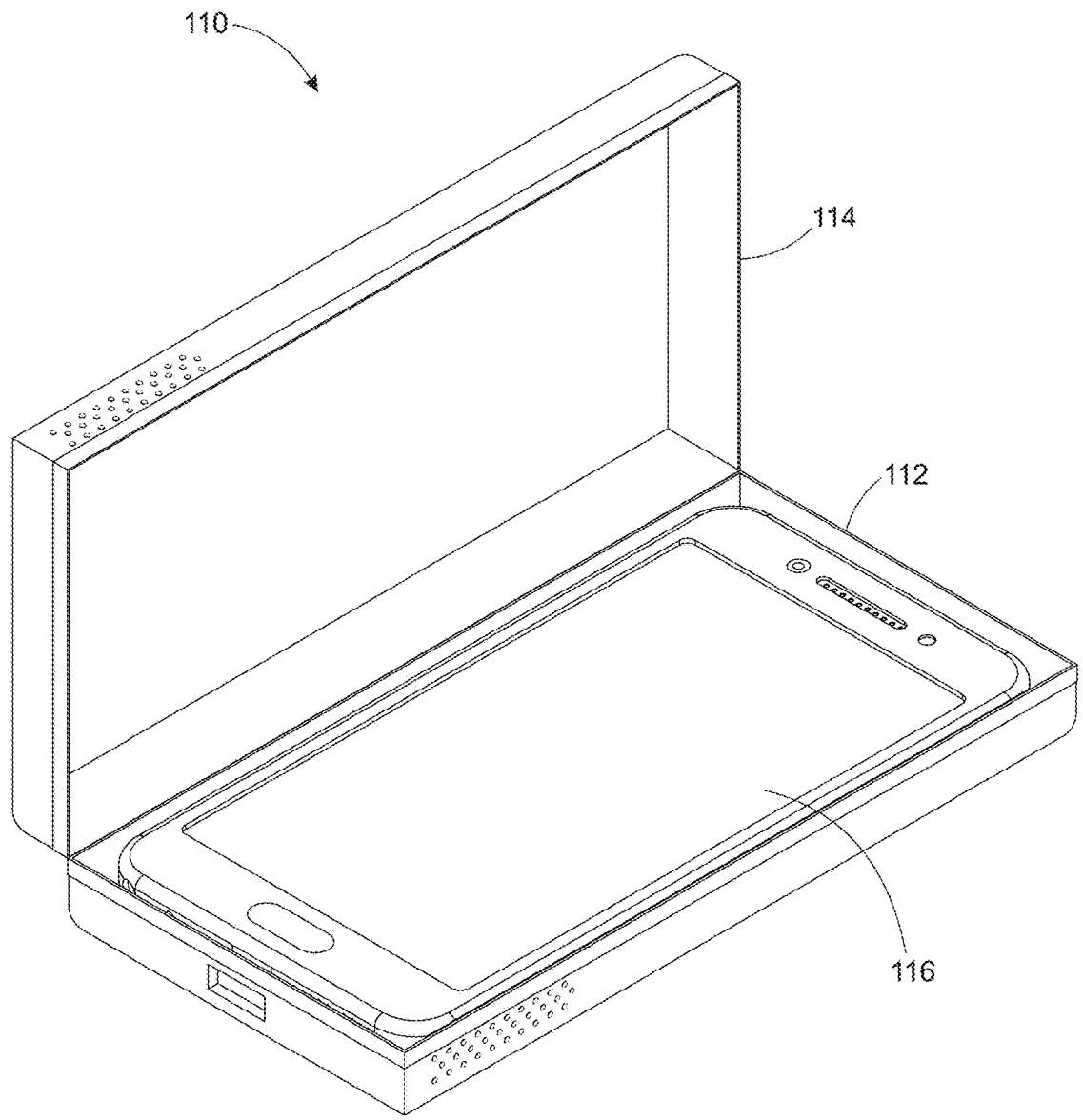
FIG. 7 is a perspective view of a smartphone lock box system with the lid opened and holding a mobile computing device according to an embodiment.

In some embodiments, display 124 may be an indicator light, such as a light-emitting diode (LED) 142, as shown in FIG. 3, a light strip, a light band, or the like. In some embodiments, display 124 may be a plurality of indicator lights. The indicator light is illuminated in response to changes in the status of smartphone lock box system 110. Indicator lights may emit light of various different colors to indicate various statuses of the smartphone lock box system 110. For example, indicator lights may emit light of a color when the battery is low on power, or when the mobile computing device 116 is being charged. Indicator lights may emit light of a different color when the mobile computing device 116 has been in the box 112 for a predetermined duration. Any number of combinations of colors of light may be emitted for any number of statuses or combinations of statuses of the smartphone lock box system 110. Further, the display may provide alerts to the user of the various statuses and further certain alerts received by the mobile computing device. The alerts may further include an audible alert to the user.

Figure 11A:
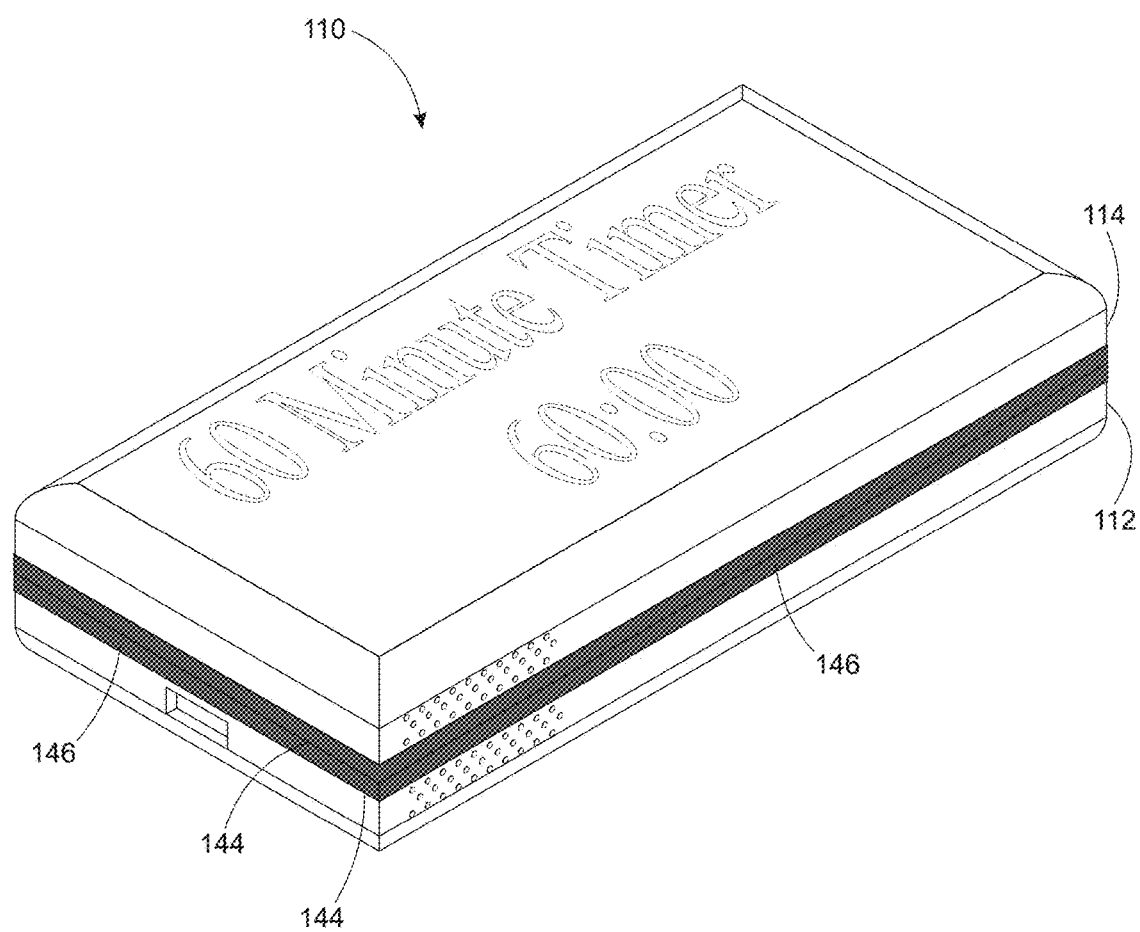
FIG. 11A is a perspective view of a smartphone lock box system with light being emitted, from an indicator light coupled to the interior of the box, and radiating outward through semi-transparent surfaces of the box and of the lid to indicate a starting of a study session according to an embodiment.
Figure 11B:
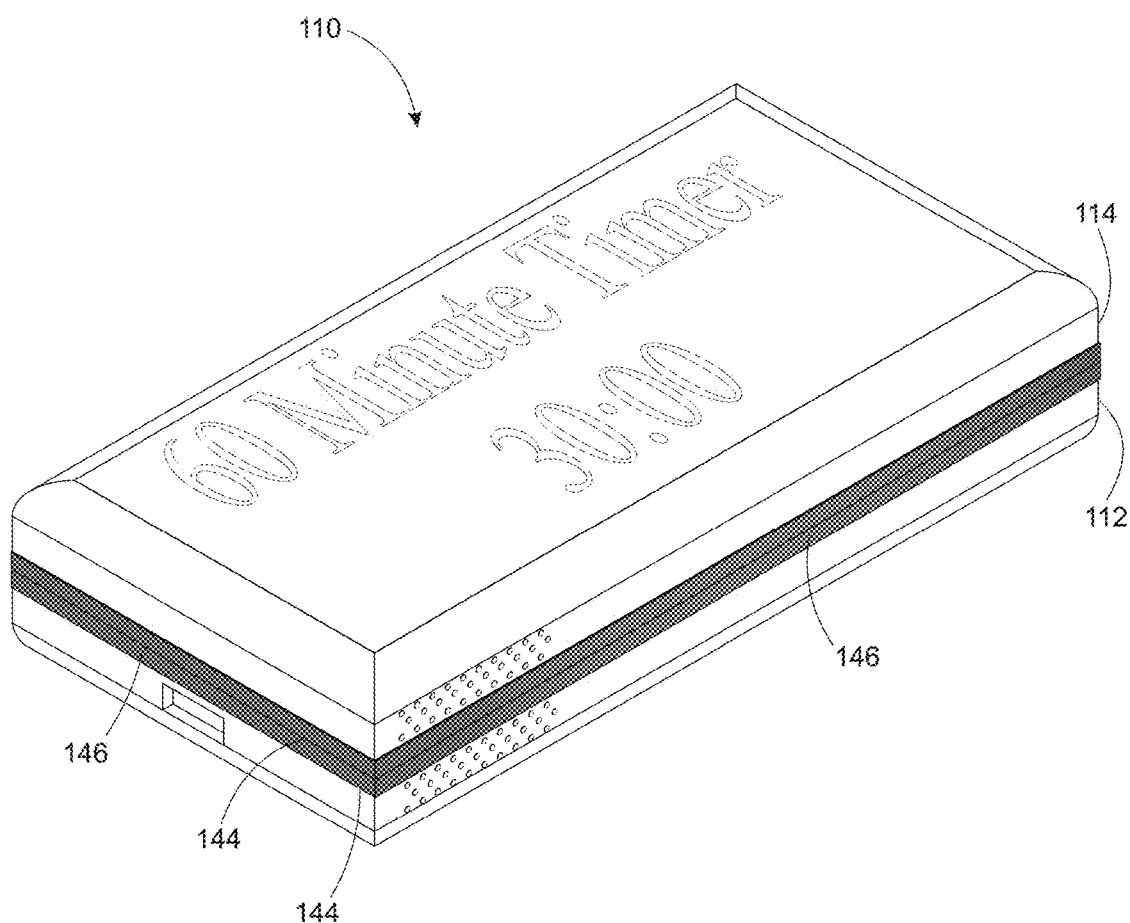
FIG. 11B is a perspective view of a smartphone lock box system with light being emitted, from an indicator light coupled to the interior of the box, and radiating outward through semi-transparent surfaces of the box and of the lid to indicate progress toward completing a study session according to an embodiment.
Figure 11C:
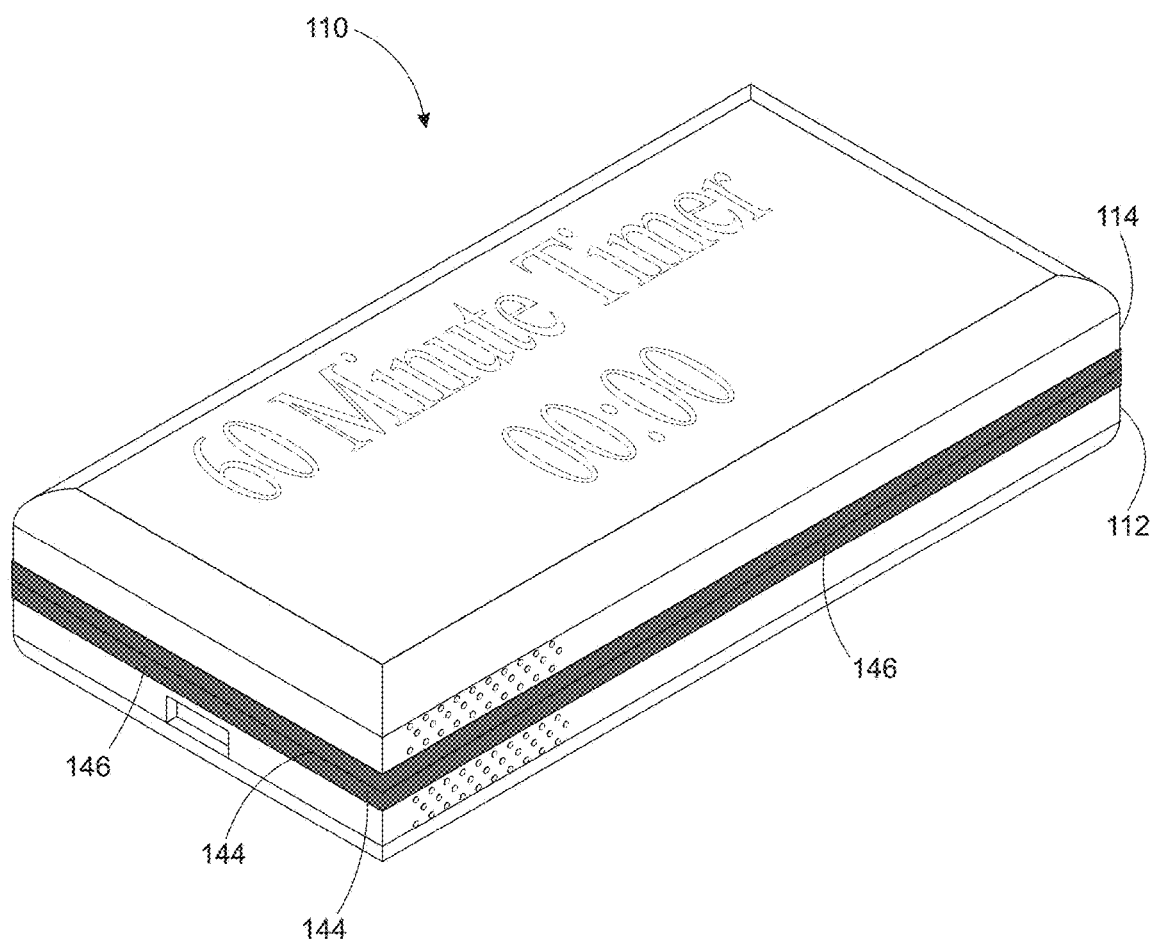
FIG. 11C is a perspective view of a smartphone lock box system with light being emitted, from an indicator light coupled to the interior of the box, and radiating outward through semi-transparent surfaces of the box and of the lid to indicate ending of a study session according to an embodiment.

In some embodiments, the indicator light is coupled to an interior surface of the box 112 or the lid 114, such that the emitted light 146, shown as the arrows of FIG. 11, is visible through a transparent or semi-transparent surface 144 of the box 112 and/or of the lid 114, when illuminated, as shown in FIGS. 11A-11C. For example, when a phone is placed within the box 112 for a study session, such as a 60 minute study session, the display may indicate the study session amount and the amount of time elapsed in the study time and an emitted light 146 may be red around the entire box 12 in order to indicate that time is relatively at the start of the study session, as shown in FIG. 11A. As the study session progresses, the time elapsed is continually updated and the emitted light 146 may adjust to transition from red to green indicating that the elapsed time is approaching the total study time, as shown in FIG. 11B. Finally, when the study session ends, the emitted light 146 may be green in color indicating a stop for the study session and that the box 112 may be opened, as shown in FIG. 11C.

In some embodiments, box 112 is communicatively coupled to the internet 130 using a communication link 132. Box 112 can communicate with internet 130 for many different reasons. In some embodiments, parents have a reward and task-tracking program set up on the internet that uses smartphone lock box system 110 to provide data on when mobile computing device 116 is in box 112. The owner of mobile computing device 116 can obtain rewards for keeping mobile computing device 116 in box 112 for a certain amount of time or certain time periods. For example, these rewards may be governed by a point system that allows the user to earn points when the smartphone is in the box 112. These points can have higher value if the smartphone is in the box 12 during peak hours, such as study hours and the like. It also operates to not give points or to give less points at times of day, such as sleep hours. In some embodiments, lock box application 126 communicates with internet 130 to obtain scheduling or other time-calendar information. In some embodiments, the time that mobile computing device 116 is locked or secured in box 112 is reported to parents, social media, employers, or other groups or individuals using internet 130.

Smartphone lock box system 110 is used to track and report the times that mobile computing device 116 is locked or secured in box 112 and limits access by the owner to the mobile computing device 116 and further reports the frequency of which the phone is removed from the box 112. The system 110 operates to limit access, but still gives the ability to access the phone if needed. Children, teens, and adults are often distracted by their smart phones and have difficulty getting tasks done and getting disconnected from technology. Smartphone lock box system 110 helps individuals disconnect from their technology and provides a way to track the amount of disconnect. Box 112 uses sensor 122 to sense when mobile computing device 116 is in box 112. Microcomputer 118 of box 112 communicates with mobile computing device 116, lock box application 126, sensor 122, and internet 130 to track and report the times and periods that mobile computing device 116 is in box 112. Parents can use smartphone lock box system 110 to monitor and understand their children's use of mobile computing device 116, wherein the parent may utilize his or her external mobile computing device to monitor the status of the smartphone in the box 12. Children and students can earn rewards for having their mobile computing device 116 be in box 112 at certain times or for certain lengths of time. Parents can apply more valuable rewards for having mobile computing device 116 be in box 112 at certain times. For example, a child may get a larger reward for putting mobile computing device 116 in box 112 at designated study times, than for sleeping times. Smartphone lock box system 110 can be used by parents to control how long children use their mobile computing device 116, and make the child choose when they won't be using mobile computing device 116. Smartphone lock box system 110 can be used by parents, teachers, students, employers, or any other individual or group to track and report when and how long one or more mobile computing device 116 is inside box 112.

In some embodiments, multiple boxes may be linked together electronically, wherein a study group of students can all have their respective smartphone in a lock box 112 and communicate with the other lock boxes 112 to ensure that all members of the study group are providing full attention to the study session or group project being worked on without distraction of a phone. In certain embodiments, special rewards for a group studying in this fashion. Further, in other scenarios, such as incentives from coaches or advisors, tutors, teacher assistants, labs and the like where members of a team or the like have certain study hours agreed to by the team and the teams study hours may be monitored by use of the lock box 112.

In this embodiment, the present invention includes a method of using a smartphone lock box system. The method includes coupling a plurality smartphone lock boxes to a server, wherein each smartphone lock box is associated with an individual employee; placing a plurality of smartphones of employees within a plurality of smartphone lock boxes, wherein one smartphone is placed within one smartphone lock box; sensing whether the plurality of smartphones are within the plurality of smartphone lock boxes in response to a sensor in each smartphone lock box sensing the presence of a smartphone, wherein each smartphone lock box communicates to the server the time the smartphone is placed within the smartphone lock box and communicates to the server the time the smartphone is removed from within the smartphone lock box; automatically storing all times communicated from the smartphone lock boxes in a memory of the server; and automatically generating a report of times that each smartphone lock box associated with each individual employee contained a smartphone to determine the time that each individual employee's smartphone is within the smartphone lock box.

Figure 13:
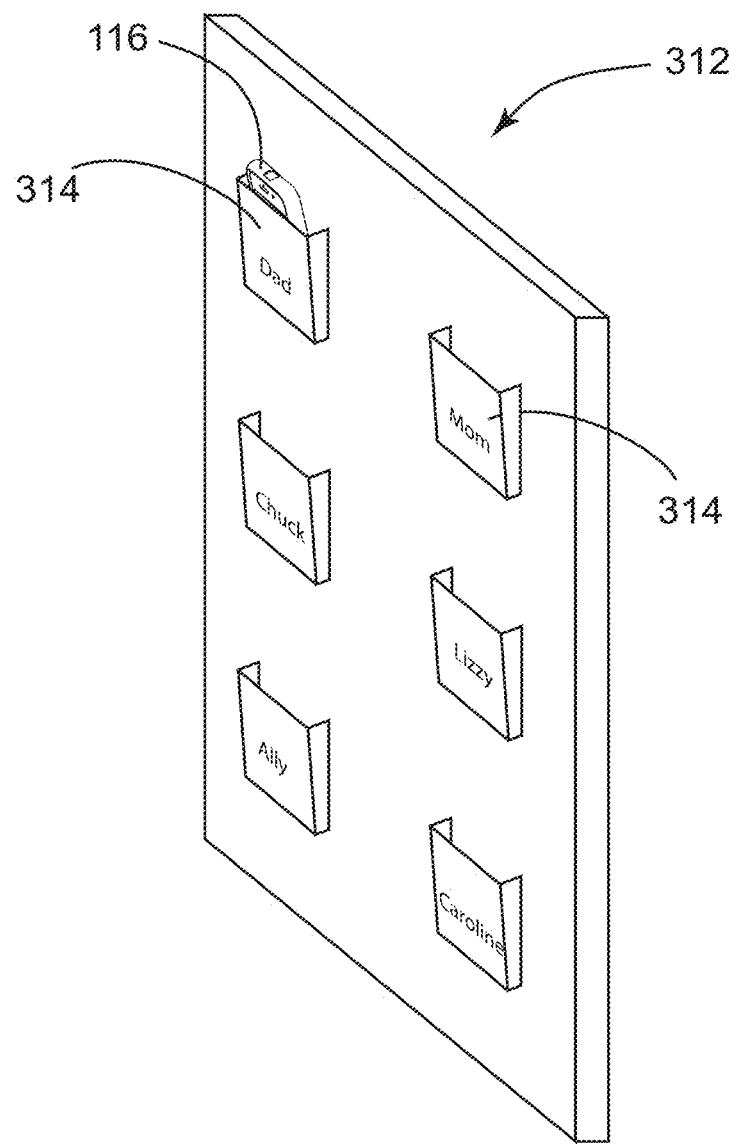
FIG. 13 is a perspective view of retaining unit for retaining a plurality of mobile computing devices, such as smartphones, for use in a home according to an embodiment.

Further, as shown in FIG. 13, the box 112 may be a multi-slot retaining unit 312, wherein there are multiple slots 314 within the retaining unit 312 sized and shaped to receive a plurality of mobile computing devices 116, such as smartphones. In such embodiments, each slot may operate in a manner similar to the lock box 112 for determining whether the smartphone 116 is within a slot 214 of the retaining unit 212 and reports the amount of time and frequency of the smartphones 116 that are removed and is capable of identifying which smartphone 116 has been removed. This embodiment of retaining unit 212 may be utilized in homes with larger families that would require a large number of lock boxes 112 in order to be effective.

The retaining unit 312 may further include a single microcomputer that can operate with the system 110 to establish a geofence, wherein a smartphone 116 operating the lock box application 126 enters the geofence when being inserted within a slot 314 of the retaining unit 312 and communicates user information in order to identify the owner of the smartphone 116 within the retaining unit 312. The operation may then be similar to or identical to the lock box 112 once the smartphone 116 is within the retaining unit 312. This may include a charging cable or other charging device that operate to charge the smartphone 116 while it is within the slot 314 of the retaining unit 312.

Embodiments may be available on or through the internet, such as through domain names reserved and owned by Applicant that include freshmanprotection.com or the like.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A smartphone lock box system comprising:
a container, wherein the container holds a mobile computing device and limits physical access to the mobile computing device; a microcomputer integrated into the hex container, wherein the microcomputer is communicatively coupled to the mobile computing device and receives information from a lock box application running on the mobile computing device; a sensor that senses when the mobile computing device is in the container and a display that displays a priority message from the mobile computing device running the lock box application while the mobile computing device is within the container; an indicator on the container that displays an indication of at least one of: an amount of time the mobile computing device has been within the container: an amount of time elapsed of a predetermined established time the mobile computing device should be in the container: or an accumulation of amounts of time the mobile computing device has been within the container during a designated period of time even if the mobile computing device was removed and replaced within the container during the designated period of time.

2. The smartphone lock box system of claim 1, further comprising a display, wherein the display is at least one indicator light, wherein the at least one indicator light is illuminated in response to changes in a status of the lock box system.

3. The smartphone lock box system of claim 1, further comprising a display, wherein the display is a screen, wherein the screen displays information related to the status of the lock box system.

4. The smartphone lock box system of claim 1, wherein the microcomputer of the box is communicatively coupled to the mobile computing device with an NFC link.

5. The smartphone lock box system of claim 1, wherein the container is communicatively coupled to the internet.

6. The smartphone lock box system of claim 1, wherein the microcomputer further comprises:
 a microprocessor integrated into the microcomputer; and
 a memory communicatively coupled to the microprocessor.

7. The smartphone lock box system of claim 1, wherein the container further comprises a charging device coupled to a power supply, wherein the mobile computing device is recharged while removably coupled to the charging device.

8. The smartphone lock box system of claim 1, wherein the container further comprises a power cord that supplies power to the smartphone lock box system when the power cord is coupled to an external power source.

9. The smartphone lock box system of claim 1, wherein the indicator is a display that displays text, a light indicator or an audible indicator.

10. The smartphone lock box system of claim 1, wherein the system reports amounts of time and time of day the mobile computing device is within the container and reports frequency of removal of the device from the container.

11. The smartphone lock box system of claim 1, further comprising a sensing boundary around the container, wherein the mobile computing device operating the lock box application when inserted within the container and into the sensing boundary automatically communicates user information of the mobile computing device within the container.

12. A smartphone lock box system comprising:
 a retaining unit, wherein the retaining unit holds a plurality of mobile computing devices; a microcomputer integrated into the retaining unit, wherein the microcomputer is
 communicatively coupled to the plurality of mobile computing devices and receives information from a plurality of lock box applications, each lock box application running on one of the plurality of mobile computing devices; a display that displays a priority message from the mobile computing device running the lock box application while the mobile computing device is within the retaining unit and a sensor that senses when one or more of the plurality of mobile computing devices is in the retaining unit: and an indicator that displays and indication of at least one of: an amount of time each of the mobile computing devices has been within the retaining unit: an amount of time elapsed of a predetermined established time each of the mobile computing devices should be in the retaining unit: or an accumulation of amounts of time each of the mobile computing devices has been within the retaining unit during a designated period of time even if each mobile computing device was removed and replaced within the retaining unit during the designated period of time.

13. The smartphone lock box system of claim 12, further comprising a display, wherein the display is at least one indicator light, wherein the at least one indicator light is illuminated in response to changes in a status of the lock box system.

14. The smartphone lock box system of claim 12, wherein the microcomputer of the retaining unit is communicatively coupled to the plurality of mobile computing devices with an NFC link.

15. The smartphone lock box system of claim 12, wherein the retaining unit is communicatively coupled to the internet.

16. The smartphone lock box system of claim 12, wherein the microcomputer further comprises:
 a microprocessor integrated into the microcomputer; and
 a memory communicatively coupled to the microprocessor.

17. The smartphone lock box system of claim 12, wherein the retaining unit is a multiple slot retaining unit, wherein each slot receives one mobile computing device.

18. The smartphone lock box system of claim 17, wherein the retaining unit is located at a workplace environment.

19. The smartphone lock box system of claim 17, wherein the retaining unit is located at a home.

20. The smartphone lock box system of claim 12, further comprising a sensing boundary around the retaining unit, wherein each mobile computing device of the plurality of mobile computing devices operating the lock box application when inserted within the retaining unit and into the sensing boundary automatically communicates user information of the mobile computing device within the retaining unit.

21. The smartphone lock box system of claim 12, wherein the system reports aggregate data for each mobile computing device and cumulative aggregated data for the plurality of mobile computing devices.

* * * * *